United States Patent [19]
Contos

[11] Patent Number: 5,924,591
[45] Date of Patent: *Jul. 20, 1999

[54] ANNULAR PIZZA PAN WITH SOLID BOTTOM

[76] Inventor: Nicholas P. Contos, 84 Mountain Rd., West Hartford, Conn. 06107

[*] Notice: This patent issued on a continued prosecution application filed under 37 CFR 1.53(d), and is subject to the twenty year patent term provisions of 35 U.S.C. 154(a)(2).

[21] Appl. No.: 08/856,876

[22] Filed: May 15, 1997

[51] Int. Cl.$^6$ .......................................................... B65D 1/24
[52] U.S. Cl. ...................... 220/573.1; 220/555; 220/23.8; 220/574.1; 220/612; 99/DIG. 15
[58] Field of Search .............................. 99/450, 430, 432, 99/DIG. 15; 220/912, 608, 573.1, 506, 553, 555, 556, 23.6, 574.1, 669, 734, 771, 612, DIG. 13, 23.8

[56] References Cited

U.S. PATENT DOCUMENTS

| | | | |
|---|---|---|---|
| 1,624,941 | 4/1927 | Fulkerson | 220/912 |
| 3,473,489 | 10/1969 | Sargent . | |
| 3,610,135 | 10/1971 | Sheridan | 99/DIG. 15 |
| 4,384,513 | 5/1983 | Pierick | 99/DIG. 15 |
| 5,514,402 | 5/1996 | Williams . | |

FOREIGN PATENT DOCUMENTS

| | | | |
|---|---|---|---|
| 7903034 | 10/1980 | Netherlands . | |
| 5883 | 2/1901 | United Kingdom | 99/DIG. 15 |

OTHER PUBLICATIONS

Advertisement, Washington Post, Aug. 19, 1983, one page.

*Primary Examiner*—Stephen Castellano
*Attorney, Agent, or Firm*—M. P. Williams

[57] ABSTRACT

A pizza pan has a short vertical wall extending upwardly from near the center of its bottom so as to form a flat annular cooking surface. The bottom has no hole at the center of the annular cooking surface. A disclosed method of cooking pizza includes forcing the dough blank over and around the wall, and crimping the dough adjacent the wall as well as the dough at the outer periphery of the blank, so as to hold the cheese and sauce between crimps.

3 Claims, 1 Drawing Sheet

ANNULAR PIZZA PAN WITH SOLID BOTTOM

TECHNICAL FIELD

This invention relates to a pizza pan having an annular cooking surface and a double-crimp method of making pizza.

BACKGROUND ART

Pizzas are typically made in an aluminum pan having a circular flat cooking surface. Frequently, the center of such pizza remains undercooked, mushy and doughy, when the outer portions of the pizza are completely cooked.

To overcome this problem, numerous suggestions have been made to utilize perforations in the pan bottom to allow moisture to escape and/or to directly expose pizza dough to oven heat. These patents include U.S. Pat. Nos. 4,176,591; 4,563,946; 5,503,063; 5,523,104; and 5,526,735. Some of these create difficulty in handling the dough, and others spoil the appearance of the finished product. In any event, the need still exists for an improved pan and method for cooking pizza.

A pizza pan in U.S. Pat. No. 5,514,404 and a pie plate in U.S. Pat. No. 3,610,135 each have a hole in the center and allege that hot gases flowing through the center hole improves the cooking.

DISCLOSURE OF INVENTION

Objects of the invention include providing a simplified pizza pan for improved cooking of pizza.

This invention is predicated on my discovery that a hole or flue in the center of a pizza pan is irrelevant to the cooking process in a contact oven or in a convection oven.

According to the present invention, a pizza pan with a highly heat-conductive, flat, uninterrupted pan bottom with a conventional edge on the outer periphery of the pan, has an annular cooking surface with a short vertical wall structure extending vertically upward from the inner periphery of the annular cooking surface. The pan bottom has no hole. The vertical wall structure may have differing shapes, and the term "annular" as used herein may include non-circular boundaries, such as polygons. However, and a cylindrical wall structure is preferred for ease of use and appearance of product. The wall structure may have various sizes, but typically will have a diameter (or other major dimension) which ranges between one-sixth and one-tenth of the diameter of the flat cooking surface; a two inch diameter cylindrical wall on a sixteen inch round pan is presently preferred.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
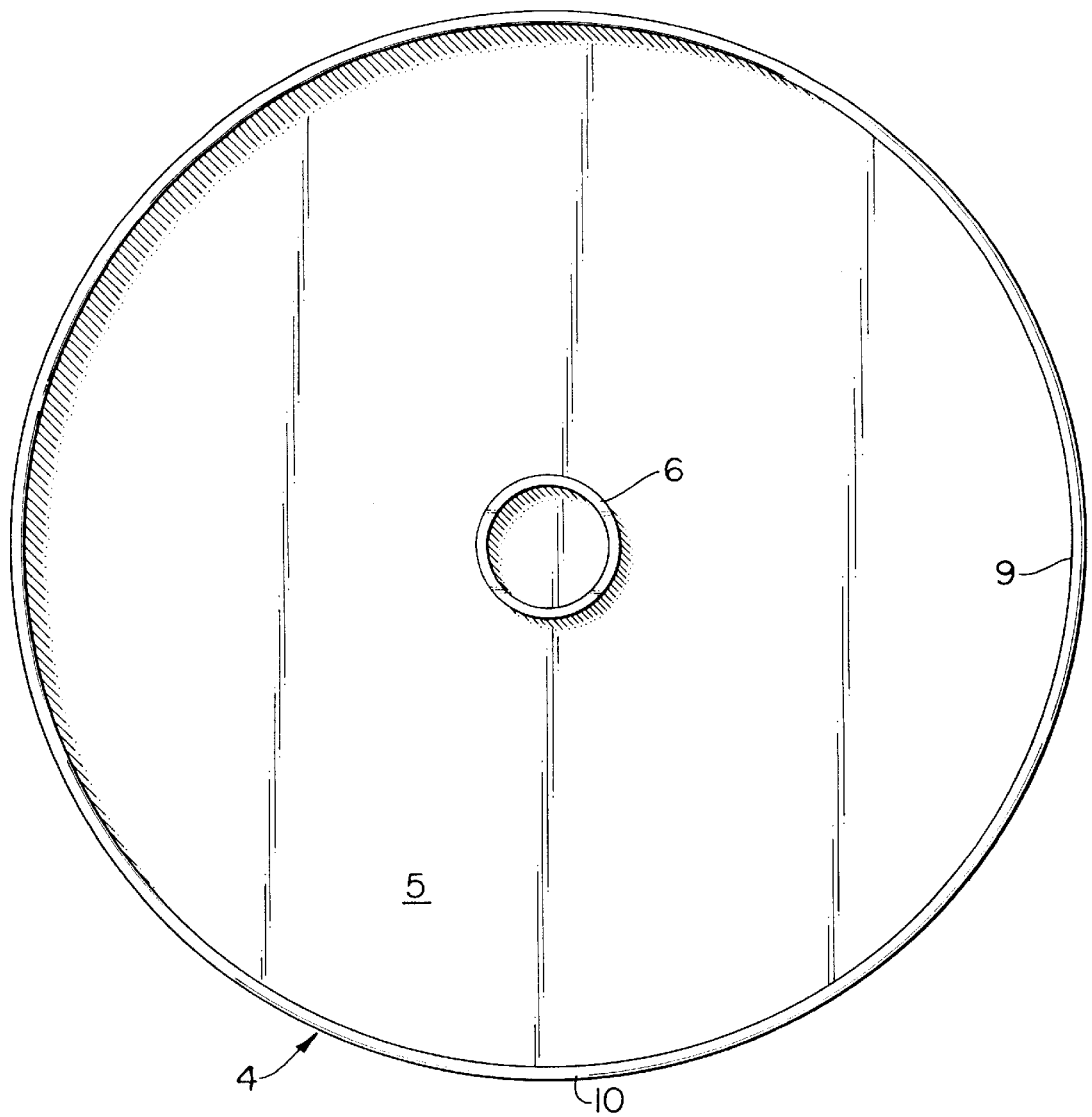
FIG. 1 is a top plan view of a pizza pan having an annular cooking surface with a central vertical wall in accordance with the present invention.
Figure 2:
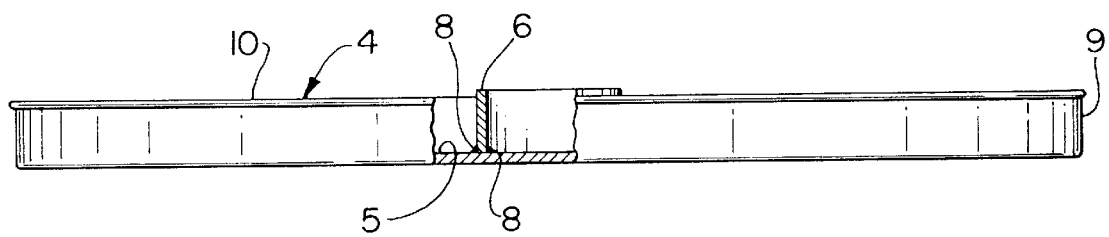
FIG. 2 is a partially broken away and sectioned side elevation view of the pizza pan of FIG. 1.

Referring now to FIGS. 1 and 2, a pizza pan 4 has an annular cooking surface 5 and a central vertical wall structure 6 disposed thereon and bonded thereto, such as by welding 8. The pan has a vertical peripheral wall 9 and crimped edge 10. In fact, one embodiment of the pizza pan 4 is a standard 16 inch aluminum pizza pan having a short cylindrical wall welded to the cooking surface of the pizza pan.

A method of cooking pizza in accordance with the invention is to provide the usually flattened raw pizza dough blank of a size proper for the pan. The pizza dough blank is then forced onto the pizza pan with the central vertical wall passing upward through the center of the pizza dough blank. The pizza dough blank is pulled outside the central vertical wall, and piled up adjacent thereto; the blank is also stretched to the peripheral wall. The blank is then crimped about its peripheral edge so as to form the conventional short dough wall to hold the sauce, cheese and toppings in the usual fashion, and is also crimped adjacent the central vertical wall of the pan so as to form a short wall of dough to contain the sauce, cheese and toppings at the center of the pizza.

Although the phenomenon is not fully understood, it is believed that the inner edge of the annular pizza provides a path for vaporous products of cooking to escape, whereby the pizza dough is drier and can cook more completely. As stated otherwise, vaporous products can escape as easily from a central half of the pizza as from the outer half of the pizza, utilizing the pan of the present invention. The central vertical wall structure also conducts heat to the dough wall in the center, so it will cook as well as the peripheral wall. The pizza cooks more evenly and reportedly tastes better.

A hole in the center of the pan is not used because it is irrelevant to the cooking process in a contact oven or in a convection oven.

The invention may be practiced with a sheet-pizza pan, typically rectangular, by having a single-layer of wall structure extending along a portion of one dimension (e.g., end to end) at a point substantially midway along another dimension (e.g., side to side).

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A pizza pan for cooking an annular shaped pizza of a single piece with a hole in the center, said pizza pan comprising;

a heat conductive, flat bottom, the bottom having an upper surface;

the upper surface having a peripheral edge, the peripheral edge has a vertical, upwardly extending peripheral wall and an annular cooking surface extending inwardly from said peripheral wall to a single, short vertical inner wall extending upwardly from the upper surface near the center of the upper surface, said inner wall is the only upwardly extending protuberance of the upper surface other than said peripheral wall;

said flat bottom extending uninterruptedly from the peripheral edge to a center point of the bottom located inwardly of said single inner wall and said flat bottom extends uninterruptedly beneath a lower edge of said single inner wall;

whereby cooking vapors are allowed to escape at an inner edge of said annular cooking surface between the pizza and said single inner wall;

wherein said single inner wall extends horizontally a distance which is between one-sixth and one-tenth the greatest horizontal distance of said annular cooking surface.

2. A pan according to claim 1 wherein said single inner wall horizontal distance is substantially one-eighth the greatest horizontal distance of said annular cooking surface.

3. A pan according to claim 1 wherein said single inner wall is a cylinder.

* * * * *